(12) United States Patent
Panabaker et al.

(10) Patent No.: US 8,238,938 B2
(45) Date of Patent: *Aug. 7, 2012

(54) FACILITATING USE OF A DEVICE BASED ON SHORT-RANGE WIRELESS TECHNOLOGY

(75) Inventors: Ruston Panabaker, Bellevue, WA (US); Pasquale DeMaio, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/767,005

(22) Filed: Apr. 26, 2010

(65) Prior Publication Data

US 2010/0210210 A1 Aug. 19, 2010

Related U.S. Application Data

(63) Continuation of application No. 11/725,960, filed on Mar. 20, 2007, now Pat. No. 7,734,299.

(51) Int. Cl.
*H04B 7/00* (2006.01)
(52) U.S. Cl. ............... 455/456.1; 455/456.2; 455/456.3
(58) Field of Classification Search ..... 455/550.1–575.9
See application file for complete search history.

(56) References Cited

U.S. PATENT DOCUMENTS

| | | |
|---|---|---|
| 6,667,690 B2 | 12/2003 | Durej et al. |
| 6,867,965 B2 | 3/2005 | Khoo |
| 7,310,070 B1 | 12/2007 | Hardman et al. |
| 7,646,316 B2 | 1/2010 | Khoo |

| | | |
|---|---|---|
| 2003/0122673 A1 | 7/2003 | Anderson |
| 2005/0054350 A1 | 3/2005 | Zegelin |

(Continued)

FOREIGN PATENT DOCUMENTS

WO 2006027725 A1 3/2006

(Continued)

OTHER PUBLICATIONS

Calvet, Juan Carlos Lopez, "The role of RFID in the mobile phone", Date: 2005, http://www.telenor.com/telektronikk/volumes/pdf/3_4.2005/Page_131-142.pdf.

(Continued)

*Primary Examiner* — Kent Chang
*Assistant Examiner* — Kashif Siddiqui
(74) *Attorney, Agent, or Firm* — Capitol City TechLaw; Richard C. Irving

(57) ABSTRACT

Various devices may include a short-range wireless transmitter and/or one or more short-range wireless readers. When a first device including the transmitter is placed near a second device including the one or more readers, a relative location of the first device may be determined. Information regarding the relative location of the first device, may be used to facilitate use of the first device with a processing device. In one embodiment, the processing device may automatically configure itself, such that the first device may be used with the processing device. In another embodiment, the processing device may provide feedback, such as, for example, step-by-step instructions to facilitate setup and use of the first device with the processing device. In some embodiments, an application program interface may provide information about the device to an application executing on the processing device.

6 Claims, 6 Drawing Sheets

U.S. PATENT DOCUMENTS

| | | |
|---|---|---|
| 2005/0073418 A1 | 4/2005 | Keliher |
| 2005/0208983 A1 | 9/2005 | Khoo |
| 2005/0283443 A1 | 12/2005 | Hardt |
| 2006/0018996 A1 | 1/2006 | Pollock et al. |
| 2006/0092072 A1 | 5/2006 | Steiner |
| 2006/0094356 A1 | 5/2006 | Dawidowsky |
| 2006/0128384 A1 | 6/2006 | Jagadeesan et al. |
| 2006/0160487 A1 | 7/2006 | Nam et al. |
| 2006/0164237 A1 | 7/2006 | Medve et al. |
| 2006/0223536 A1 | 10/2006 | Chia |
| 2006/0292984 A1 | 12/2006 | Teate et al. |
| 2007/0042807 A1 | 2/2007 | Khoo |
| 2008/0065238 A1 | 3/2008 | Igoe |
| 2008/0233971 A1* | 9/2008 | Panabaker et al. ......... 455/456.1 |
| 2009/0174670 A1 | 7/2009 | Diederiks |
| 2009/0237379 A1 | 9/2009 | Lawrenz |

FOREIGN PATENT DOCUMENTS

| | | |
|---|---|---|
| WO | 2006085246 A1 | 8/2006 |
| WO | 2006085269 A1 | 8/2006 |

OTHER PUBLICATIONS

Pering, et al., "Spontaneous Marriages of Mobile Devices and Interactive Spaces", Date: Sep. 2005, pp. 53-59, vol. 48, Issue 9, http://delivery.acm.org/10.1145/1090000/1082020/p53-pering.pdf?key1=1082020&key2=6468494611&coll=GUIDE&dl=GUIDE&CFID=7682489&CFTOKEN=58955499.

Scott, et al., "Using Visual Tags to Bypass Bluetooth Device Discovery", Date: Jan. 2005, pp. 41-53, vol. 9, Issue 1, http://delivery.acm.org/10.1145/1060000/1055965/p41-scott.pdf?key1=1055965&key2=3638984611&coll=GUIDE&dl=GUIDE&CFID=5798034&CFTOKEN=71810490.

* cited by examiner

FACILITATING USE OF A DEVICE BASED ON SHORT-RANGE WIRELESS TECHNOLOGY

This application is a continuation application of co-pending U.S. patent application Ser. No. 11/725,960, filed in the U.S. Patent and Trademark Office on Mar. 20, 2007.

BACKGROUND

A user of a processing device, such as a personal computer, may arrange multiple display monitors on a desk for use with the processing device. Such an arrangement requires the user to have a significant level of skill to configure the multiple display monitors to properly work with the processing device, given a relative location of the multiple display monitors with respect to one another, an orientation of the multiple display monitors, and types and capabilities of the multiple display monitors. For example, the user may need to take initiative to discover display monitor sharing technologies and to learn how to configure multiple display monitors to share display screens. Further, when configuring a second display monitor to work with a processing device and a first display monitor, the processing device may assume that the second display monitor has a specific relative location to the first display monitor. For example, the processing device may assume that the second display monitor is physically located on a right side of the first display monitor, thereby requiring the user to indicate to the processing device a correct relative physical location of the second display monitor with respect to the first display monitor when the second display monitor does not have the relative location assumed by the processing device.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a first device, to be used with a processing device, may include a short-range wireless transmitter. A second device, to be used with the processing device, may include one or more short-range wireless readers for reading a signal transmitted by the short-range wireless transmitter. In some embodiments, the short-range wireless transmitter may be a portable contactless smartcard transceiver attached to, or embedded within, the first device. When the first device is placed near the second device, the short-range wireless transmitter of the first device may transmit a signal, which may be received by the one or more short-range wireless readers of the second device. The signal may include an identification of the first device, which may indicate a type of the first device, and may include other information. Information from the signal, along with related information, such as, for example, signal strength information from the one or more short-range wireless readers, may be sent to a processor of the processing device, which may use the signal strength information to determine a relative location of the first device. Information about the relative location of the first device may be used by the processing device to facilitate use of the first device with the processing device. In one embodiment, the first device and the second device may be display monitors and the information about the relative location of the first device may include information about the relative location of one of the display monitors with respect to another of the display monitors.

In other embodiments, the devices may be other types of devices. For example, in an embodiment consistent with the subject matter of this disclosure, the first device may be a digital camera including a short-range wireless transmitter, and the second device may be a component of a processing device, such as, for example, a keyboard having one or more short-range wireless readers for reading a signal transmitted by the short-range wireless transmitter. When the digital camera is placed close to the keyboard, the one or more short-range wireless readers may read a signal transmitted by the short-range wireless transmitter. An identification of the digital camera, which may be included in the short-range signal, may be provided to a processor of the processing device, along with signal strength information from the one or more short-range wireless readers. Based, at least in part, on the signal strength information, the processor may determine a relative location of the digital camera and may provide feedback to a user to facilitate use of the digital camera with the processing device. In one embodiment, the feedback may include step-by-step instructions for a user to configure the processing device for use with the digital camera.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 a functional block diagram illustrating an exemplary processing device, which may be used in implementations consistent with the subject matter of this disclosure.

DETAILED DESCRIPTION

Figure 1:
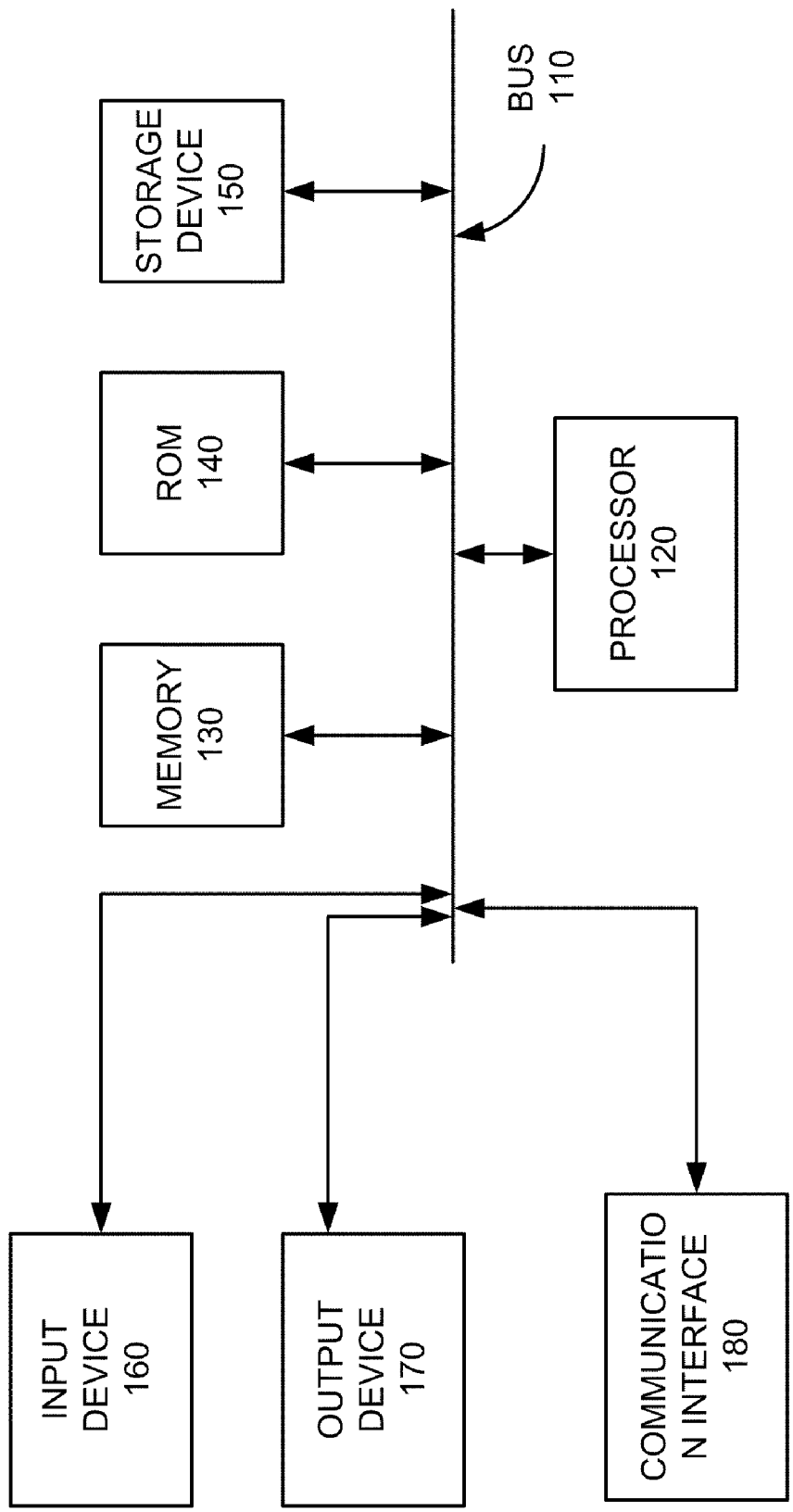

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

Near Field Communication (NFC) is a short-range wireless technology developed from existing contactless identification technologies and interconnection technologies. Radio Frequency Identification (RFID) technology, typically, is used as an alternative to bar coding. RFID technology uses devices attached to objects to transmit data to an RFID receiver. Both technologies involve short-range wireless communication.

In embodiments consistent with the subject matter of this disclosure, a first device may include a transmitter for transmitting a short-range wireless protocol signal. The transmitter may be a portable contactless smart card transceiver attached to, or embedded within, the first device. The transmitter may transmit information identifying the first device via a short-range wireless protocol signal, such as, for example, a Near Field Communication (NFC) protocol signal or a Radio Frequency IDentification (RFID) protocol signal. One or more readers may be attached to, or embedded within, a second device, which may be associated with a processing device. The one or more readers may receive and read information included in a transmitted short-range wireless protocol signal. In one embodiment, the first device and the second device may be display monitors, located close to one another, to be used with the processing device. In another embodiment, the first device and the second device may be display monitors, located close to one another, and connected to different processing devices, wherein the processing devices may cooperate such that the display monitors work cooperatively. In a third embodiment, the first device may be a display monitor and the second device may be a keyboard connected to the processing device.

In one embodiment a first display monitor may be connected to a processing device. The first display monitor may have attached thereto, or embedded therein, one or more readers for receiving and reading information from a short-range wireless signal, such as, for example, a NFC protocol signal, a RFID protocol signal, or other short-range wireless signal. A second display monitor, to be used with the first display monitor, may be moved into a position close to the first display monitor. The second display monitor may have attached thereto, or embedded therein, a transmitter for transmitting a short-range wireless signal, such as, for example, a NFC protocol signal, a RFID protocol signal, or other signal. The transmitted short-range wireless signal may include an identification identifying the second display monitor. The one or more readers of the first display monitor may read the transmitted short-range wireless signal and may transmit information regarding the short-range wireless signal to a processor of the processing device. The processor may determine a relative location of the second display monitor using a triangulation technique, and may determine an orientation of the second display monitor based, at least partly, on a strength of the signal received by the one or more readers. The processor may then use information related to the relative location of the second display monitor with respect to the first display monitor to facilitate use of the second display monitor with the first display monitor. For example, the processing device may automatically configure itself to work with the second display monitor, in addition to the previously-configured first display monitor.

In an alternate embodiment, instead of automatically configuring the processing device to work with the second display monitor, the processing device may provide step-by step instructions to a user for configuring the processing device to use the second display monitor. For example, the processing device may display information indicating a relative location of the second display monitor with respect to the first display monitor and may ask the user to confirm the relative location of the second display monitor. By using the information identifying the second display monitor, the processing device may determine a type of the second display monitor and may provide detailed information to a user for connecting the second display monitor to the processing device and configuring the processing device to work with the second display monitor.

In other embodiments, another type of device may include a short-range wireless transmitter, which may be a contactless transmitter, such as a NFC transmitter, a RFID transmitter, or another type of contactless short-range wireless transmitter. For example, the device may be a digital camera or other device that may be used with a processing device. Short-range wireless readers attached to or embedded within one or more components of the processing device may read a signal from the short-range wireless transmitter. A relative location of the device may be determined by using a triangulation technique and the relative location of the device may be used to present a user with feedback for facilitating use of the device. In one embodiment, the feedback may include step-by-step-instructions for configuring the processing device to work with the device. For example, the processing device may present a display showing the relative location of the device with respect to the processing device or a component thereof, such as, for example, a keyboard, a monitor, or other component.

Exemplary Processing Device

FIG. 1 is a functional block diagram that illustrates an exemplary processing device 100, which may be used to implement embodiments consistent with the subject matter of this disclosure. Processing device 100 may include a bus 110, a processor 120, a memory 130, a read only memory (ROM) 140, a storage device 150, an input device 160, an output device 170, and a communication interface 180. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media for storing data and/or instructions.

Input device 160 may include one or more conventional mechanisms that permit a user to input information to processing device 100, such as, for example, a keyboard, a mouse, or other input device. Output device 170 may include one or more conventional mechanisms that output information to the user, including one or more displays, or other output devices.

Processing device 100 may perform such functions in response to processor 120 executing sequences of instructions contained in a tangible machine-readable medium, such as, for example, memory 130, or other medium. Such instructions may be read into memory 130 from another machine-readable medium, such as storage device 150, or from a separate device via communication interface 180, which may include a transceiver for providing a wired or wireless communication interface to a network.

Exemplary Configurations

Figure 2:
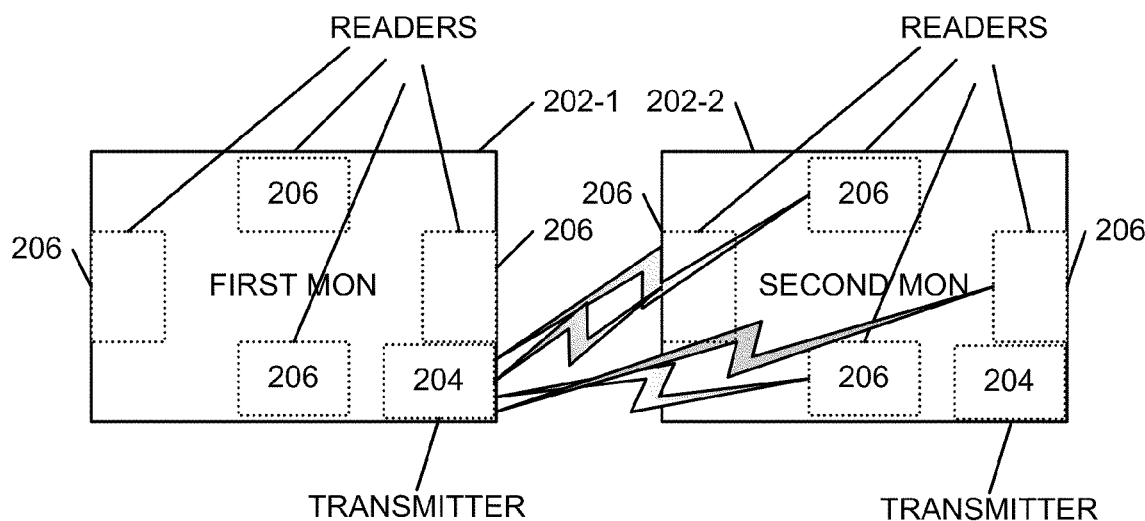
FIG. 2 is a functional block diagram illustrating display monitors, which may be used in embodiments consistent with the subject matter of this disclosure.

FIG. 2 illustrates an exemplary configuration including two display monitors, a first monitor 202-1 and a second monitor 202-2, which may be used in embodiments consistent with the subject matter of this disclosure. First and second monitors 202-1, 202-2 each may include a short-range wireless transmitter 204 (also known as a target) for transmitting a short-range wireless signal, which may include an identifier to identify each respective monitor and other useful information for configuring a processing device to work with the respective monitors. Transmitter 204 may be attached to the respective monitors, or may be embedded therein. In the exemplary configuration of FIG. 2, transmitter 204 is shown attached to, or embedded within a bottom right portion of display monitors 202-1, 202-2, although transmitter 204 may be attached or embedded in a number of different locations of monitors 202-1, 202-2. The short-range wireless signal may be sent using a Near Field Communication (NFC) protocol, a Radio Frequency IDentification (RFID) protocol, or another short-range wireless protocol. In some embodiments, transmitter 204 may be a contactless transceiver.

First monitor 202-1 and second monitor 202-2 each may include one or more short-range wireless signal readers 206 (also known as initiators). In the exemplary configuration of FIG. 2, each of monitors 202-1, 202-2 may include four readers 206. Readers 206 may be located at a top portion, a bottom portion, a right-side portion, and a left-side portion of monitors 202-1, 202-2. Of course, in other embodiments, monitors may have more or fewer readers 206 located in different or additional locations.

The configuration shown in FIG. 2 is exemplary. In other embodiments, other configurations may be employed. For example, first monitor 202-1 may include one or more readers 206 and no transmitter 204, while second monitor 202-2 may include one transmitter 204 and no readers 206. In another exemplary configuration, either of first monitor 202-1 or second monitor 202-2 may be an ultra-wideband wireless monitor. Of course, numerous other configurations may be employed in other embodiments consistent with the subject matter of this disclosure.

Figure 3:
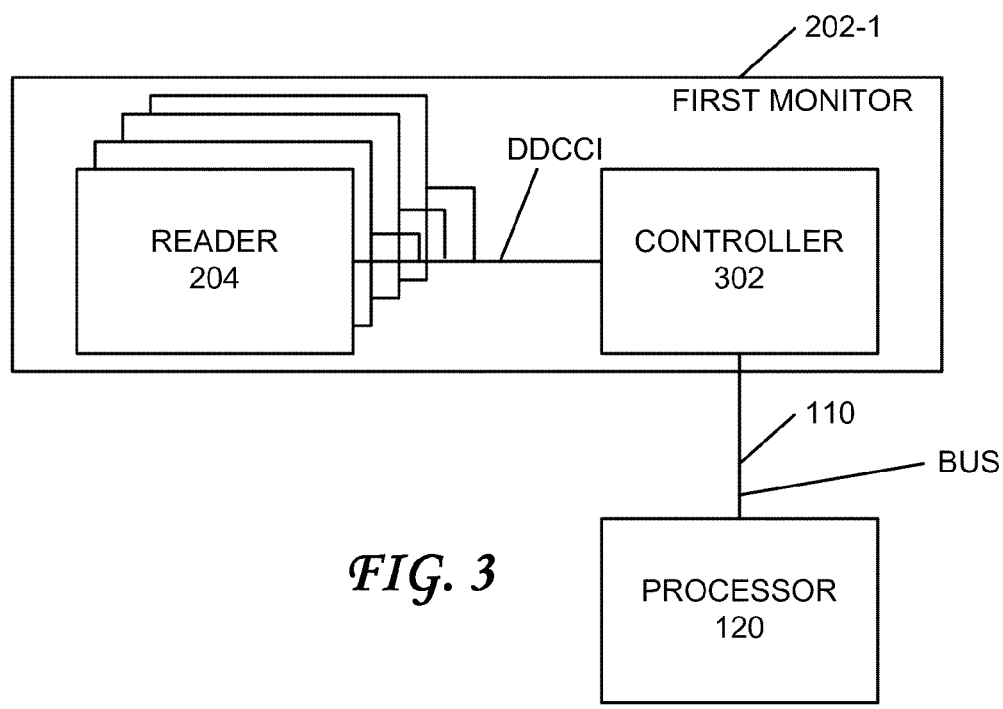
FIG. 3 is a functional block diagram illustrating one way in which short-range wireless readers, included in an exemplary display monitor, may provide information to a processor of a processing device.

FIG. 3 shows an exemplary configuration of readers 204 in the first monitor 202-1. When readers 204 read a short-range wireless signal, information from the signal may be sent to a controller 302 of first monitor 202-1 via a Display Data Channel/Command Interface (DDCCI). Controller 302 may pass the information from the signal to processor 120 via bus 110. In other embodiments, other configurations may be implemented. For example, in one embodiment, readers 204 may pass the information from the signal directly from readers 204, via bus 110, to processor 120.

Figure 4:
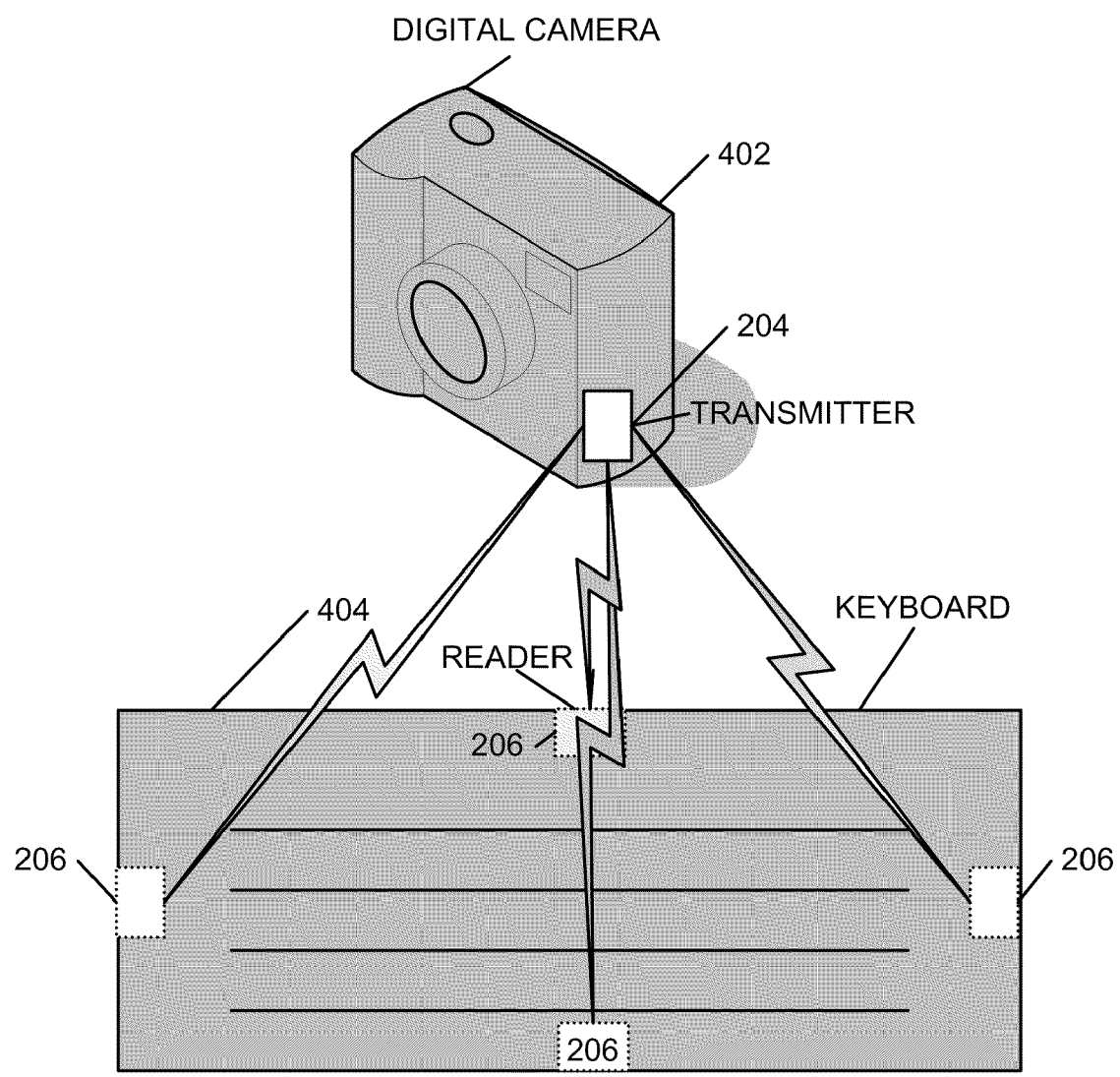
FIG. 4 illustrates a digital camera and a keyboard, which may be used in embodiments consistent with the subject matter of this disclosure.

FIG. 4 illustrates other devices, which may be used in embodiments consistent with the subject matter of this disclosure. For example, a digital camera 402 may include transmitter 204 for transmitting a short-range wireless signal. Transmitter 204 may be a contactless transmitter attached to digital camera 402 or embedded within digital camera 402. A keyboard 404 may include a number of readers 206 for reading a transmitted short-range wireless signal. In the exemplary embodiment of FIG. 4, keyboard 404 includes four readers 206 located at a top portion of keyboard 404, a right-side portion of keyboard 404, a left-side portion of keyboard 404, and a bottom portion of keyboard 404. Readers 204 may be attached to keyboard 404, or may be embedded within keyboard 404. In other embodiments, keyboard 404 may include more or fewer readers 206, which may be placed at other locations of keyboard 404.

In one embodiment, when a digital camera 402 is located close to keyboard 404, readers 206 may read a signal from transmitter 204. The signal may include an identifier of digital camera 402. Readers 206 may transmit information from the received signal, such as, for example, the identifier of digital camera 402, to processor 120 directly, through a communication interface used by keyboard 404, or via a keyboard controller (not shown). Processor 120 may receive information from the received signal and may look up the identifier in a table, thereby identifying the signal as one being sent from digital camera 402. Processor 120 may have access to information regarding locations of readers 206 within keyboard 404. Processor 120 may further receive information concerning a strength of the received signal from readers 206 and may use a triangulation technique to determine a relative location of digital camera 402 with respect to keyboard 404. In some embodiments, processor 120 may cause a display to be presented to a user showing a relative location of digital camera 402 with respect to some component of the processing device, such as, for example, keyboard 404, or another component of the processing device, which may include one or more readers 206. Further, processor 120 may display instructions to the user, such as, for example, step-by-step instructions for the user to configure digital camera 402 to work with the processing device.

Exemplary Processing

Figure 5:
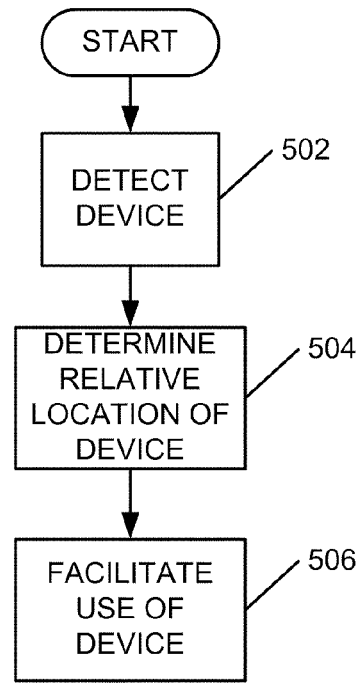
FIGS. 5-7C are flowcharts illustrating exemplary processes, which may be performed in embodiments consistent with the subject matter of this disclosure.

FIG. 5 illustrates a flowchart of an exemplary process that may be implemented in embodiments consistent with the subject matter of this disclosure. First, a device associated with a processing device, such as, for example, a display monitor, a keyboard, or other device, having a number of short-range wireless signal readers attached to or embedded therein, may detect and receive a signal transmitted from a short-range wireless signal transmitter attached to, or embedded within a second device, which may not yet be associated with the processing device, such as, for example, a digital camera, a display monitor, or other device (act 502). The signal may include an identifier identifying the second device as a monitor, a digital camera, or other device, and may include information concerning a location of the short-range wireless signal transmitter with respect to the second device. Information about the signal, the identifier, and the location of the short-range wireless signal transmitter with respect to the second device, may be passed through a communication interface to a processor, such as processor 120, which may process the information, including signal strength information from the short-range wireless signal readers, and may determine a relative location of the second device with respect to the first device using a triangulation technique or other technique and may determine an orientation of the second device (act 504).

Figure 6:
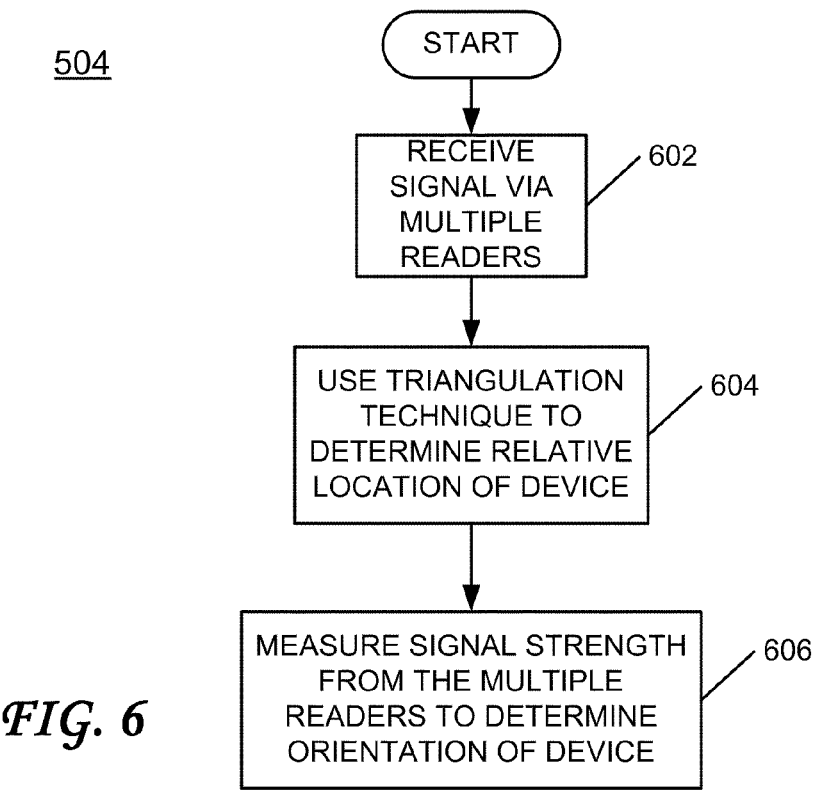

FIG. 6 is a flowchart illustrating an exemplary process of act 504 for determining the relative location of the second device. First, a processor, such as processor 120, may receive information about a received signal from multiple short-range wireless signal readers 206 (act 602). The information may include signal strength information from each one of multiple readers 206, an identification of the second device, and information regarding the location of the short-range wireless signal transmitter with respect to the second device. Next, processor 120 may execute instructions to perform a triangulation technique using the signal strength information from each one of multiple readers 206 to determine a location of the second device with respect to the device associated with the processing device (act 604). Further, processor 120 may execute instructions to determine an orientation of the second device based, at least partly, on the measured signal strength from multiple readers 206 (act 606). For example, if the second device is a display monitor, processor 120 may determine whether the display monitor is positioned in a portrait orientation or a landscape orientation.

Returning back to FIG. 5, the processor may then facilitate use of the second device with the processing device (act 506).

Figure 7A:
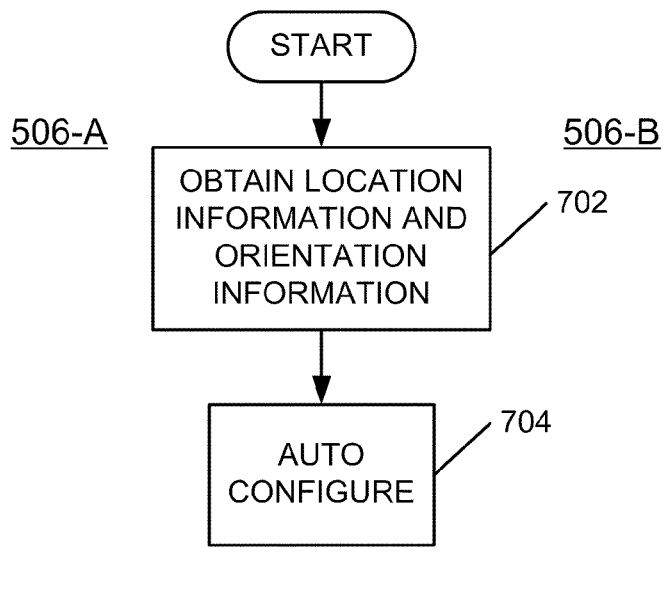

FIG. 7A is a flowchart of an exemplary process 506-A for performing act 506 of FIG. 5 for facilitating use of the second device. First, processor 120 of the processing device may obtain relative location information and orientation information with respect to the second device (act 702). Next, processor 120 of the processing device may execute instructions to automatically configure the processing device to work with the second device (act 704). In some embodiments, configuring the processing device to work with the second device may include the processing device querying the second device to determine whether the second device has one or more readers 206. If the second device has one or more readers 206, then the second device may respond to the processing device with information concerning a number of readers 206 included in the second device, as well as information concerning locations of the number of readers 206 with respect to the second device. Thus, the processing device may store information concerning readers 206 included in the second device, as well as their locations with respect to the second device. The information may be used at a later time to determine the relative location and/or an orientation of a third device, including transmitter 204, when the third device is placed near the second device.

Figure 7B:
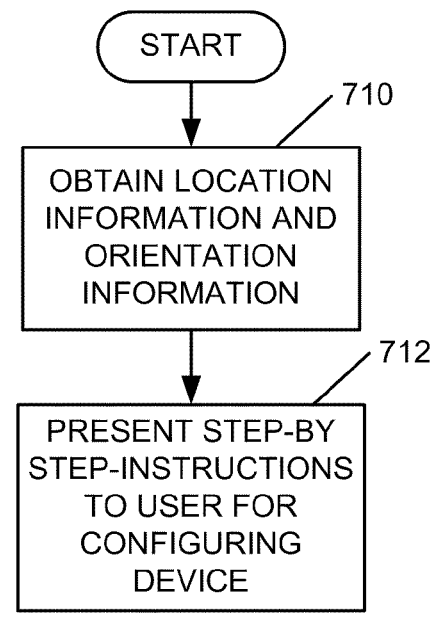

FIG. 7B is a flowchart of an exemplary process 506-B for performing act 506 of FIG. 5 in another embodiment consistent with the subject matter of this disclosure. First, the processor of the processing device may obtain relative location information and orientation information with respect to the second device (act 710). Next, the processing device may execute instructions to provide feedback to facilitate setup and use of the second device with the processing device. In one embodiment, the feedback may include presenting, to a user, step-by-step instructions for configuring the processing device to work with the second device (act 712). In some embodiments, the processing device may display an indication of the relative location of the second device and may instruct the user, in a step-by-step manner, how to connect the second device with the processing device and configure the processing device to work with the second device.

Figure 7C:
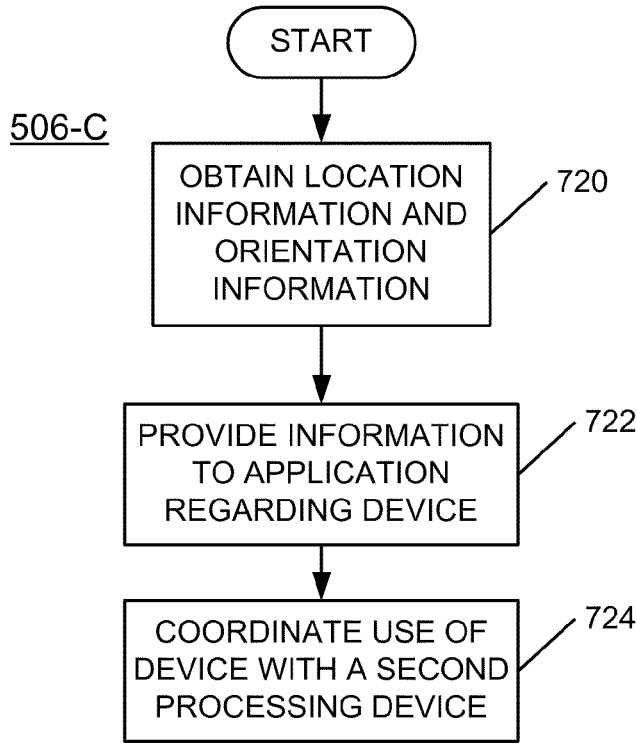

FIG. 7C is a flowchart of an exemplary process 506-C for performing act 506 of FIG. 5 in another embodiment consistent with the subject matter of this disclosure. First, processor 120 of the processing device may obtain relative location information and orientation information with respect to the second device (act 720). Information about the second device may then be provided, via an application program interface (API) to an application executing on the processing device (act 722). In one embodiment, the application may pre-register to receive information regarding one or more particular types of devices. The information provided to the application may include, for example, an identifier identifying a device, such as, for example, the second device, a relative location of the second device with respect to the device, as well as other or different information about the second device. The application may then coordinate use of the second device, which may be connected to a second processing device such that the device, connected to the processing device, and the second device, connected to the second processing device, may be used together in a cooperative manner (act 724). For example, the application may provide information about the device associated with the processing device and the relative location of the second device, with respect to the device, to the second processing device.

In an embodiment consistent with the subject matter of this disclosure, a device, such as a first display monitor having short-range wireless transmitter 204, may be connected to a first processing device. A second display monitor, which may be associated with a second processing device and may include multiple short-range wireless readers 206, may be placed close to the first display monitor. Information received by short-range wireless readers 206 may be provided to processor 120 of the second processing device, which may then determine relative location and orientation of the first display monitor using techniques previously discussed, or other techniques. Based on the information received by short-range wireless readers 206, information about the first display monitor may be provided, via an API, to an application executing on processor 120 of the second processing device. The application may then contact the first processing device and coordinate use of the second display monitor with the first display monitor of the first processing device.

Figure 8:
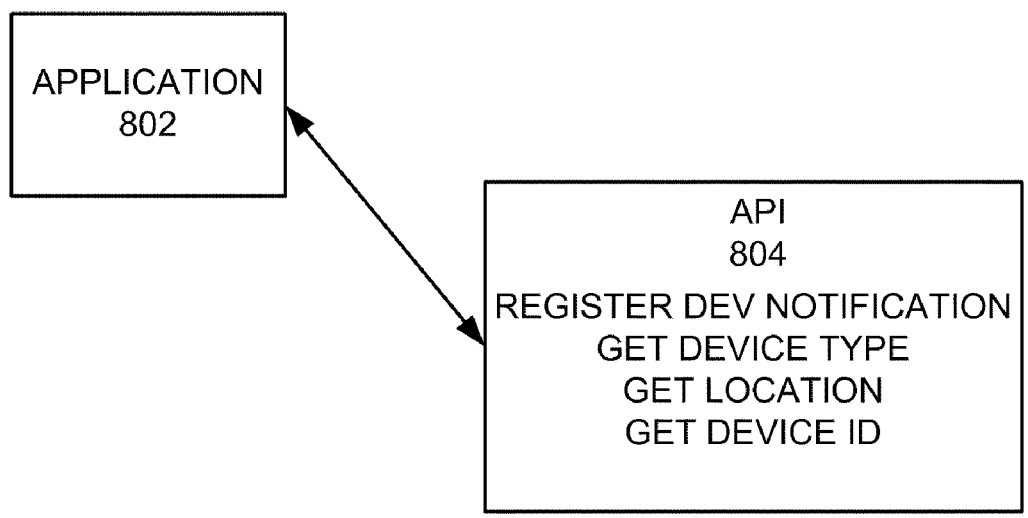
FIG. 8 is a block diagram illustrating an application registering to receive notifications with respect to one or more devices and receiving information regarding the one or more devices via an application program interface.

As mentioned above, in some embodiments consistent with the subject matter of this disclosure, an API may be provided to provide an application with information about a device detected via receiving information received through a number of short-range wireless readers 206. FIG. 8 illustrates an exemplary application 802 and an exemplary API 804. Application 802 may use API 804 to register application 802 to receive notifications regarding one or more types of devices, such as, for example, display monitors, digital cameras, or other devices. Subsequently, application 802 may receive a notification regarding detection of the one or more types of devices for which application 802 registered to receive notifications. Further, application 802 may use API 804 to obtain information about a detected device, such as, for example, a device type, a relative location of the device, an orientation of the device, a device ID, or different or other information about the device.

Miscellaneous

Short-range wireless transmitters and receivers, such as transmitters 204 and readers 206, which may use NFC technology, RFID technology, or other short-range wireless technology, may also be used for other purposes, such as swiping a smartcard, unlocking a processing device, such as, for example, a personal computer (PC), or other processing device, transferring data to other devices, authenticating a user to use one or more resources of a processing device, or other purposes. For example, a device, such as, a digital picture frame including transmitter 204, may be detected by a device, such as a keyboard including one or more readers 206. Information about the digital picture frame may be transmitted to a processor of a processing device associated with the keyboard, thereby causing the processing device to transmit digital images to the digital picture frame for display. As another example, a user may be carrying a device, such as, for example, a keychain, a digital camera, or other device, which may include short-wave wireless transmitter 204. When the keychain is close to one or more readers 206 of a processing device, an identification of the device may be received by readers 206 and may be passed to a processor of the processing device. A level of trust may have been previously established with the processing device, such that the user may be authenticated to use resources of the processing device based on the received short-range signal from transmitter 204 of the keychain. Further, the processing device may automatically configure itself to use the device.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A dynamic or static storage device having instructions stored therein such that, when the instructions are executed by at least one processor of a processing device, the processing device performs a method comprising:
   determining a relative location of a first device based, at least in part, on a strength of a short-range wireless signal received through a plurality of reader devices;
   identifying a type of the first device and an orientation of the first device based, at least in part, on the received short-range wireless signal; and
   performing an action to facilitate use of the first device with the processing device based, at least in part, on the identified type of the first device, the identified orientation of the first device, and the determined relative location of the first device.

2. The dynamic or static storage device of claim 1, wherein the performing an action to facilitate use of the first device with the processing device, based on the identified type of the first device, the identified orientation of the first device, and the determined relative location of the first device, further comprises:
   automatically configuring the processing device to use the first device.

3. The dynamic or static storage device of claim 1, wherein the performing an action to facilitate use of the first device with the processing device based, at least in part, on the identified type of the first device, the identified orientation of the first device, and the determined relative location of the first device, further comprises:
   automatically configuring the processing device to use the first device, and
   authenticating a user of the first device based, at least in part, on the information included in the received short-range wireless signal.

4. The dynamic or static storage device of claim 1, wherein the performing an action to facilitate use of the first device with the processing device based, at least in part, on the identified type of the first device, the identified orientation of the first device, and the determined relative location of the first device, further comprises:
   providing feedback to a user with respect to the first device, the feedback including information about the relative location of the first device and setup and use of the first device.

5. The dynamic or static storage device of claim 1, wherein the performing an action to facilitate use of the first device with the processing device based, at least in part, on the identified type of the first device, the identified orientation of the first device, and the determined relative location of the first device, further comprises:
   providing information regarding the relative location of the first device to an application via an application program interface.

6. The dynamic or static storage device of claim 1, wherein the performing an action to facilitate use of the first device with the processing device based, at least in part, on the identified type of the first device, the identified orientation of the first device, and the determined relative location of the first device, further comprises:
   providing information regarding the relative location of the first device to an application via an application program interface,
   sending the information regarding the relative location of the first device to a second processing device, and
   coordinating usage of the first device between the processing device and the second processing device.

* * * * *